June 5, 1945.  C. POLSTRA  2,377,368

VEHICLE COUPLING

Filed Nov. 14, 1942

INVENTOR
Charles Polstra
By Parker, Carlson, Pitzner & Hubbard
ATTORNEYS

Patented June 5, 1945

2,377,368

UNITED STATES PATENT OFFICE 2,377,368

VEHICLE COUPLING

Charles Polstra, Rockford, Ill.

Application November 14, 1942, Serial No. 465,534

8 Claims. (Cl. 280—33.17)

This invention relates to a coupling for detachably connecting tractor and trailer vehicles and in certain of its aspects concerns a ball and socket type of coupling having a ball held in a socket by a jaw movable transversely of the swiveling axis.

One object is to provide a coupling of the above character having a novel means for actuating the jaw to lock and release the ball.

Another object is to provide such a coupling in which the jaw locking means includes a member which is shiftable downwardly to lock the jaw and is latched in raised position to release the jaw.

A further object is to provide a coupling of the above character in which the latching means is housed within the socket structure.

Other objects and advantages of the invention will become apparent from the following detailed description taken in connection with the accompanying drawing, in which.

Figure 1:
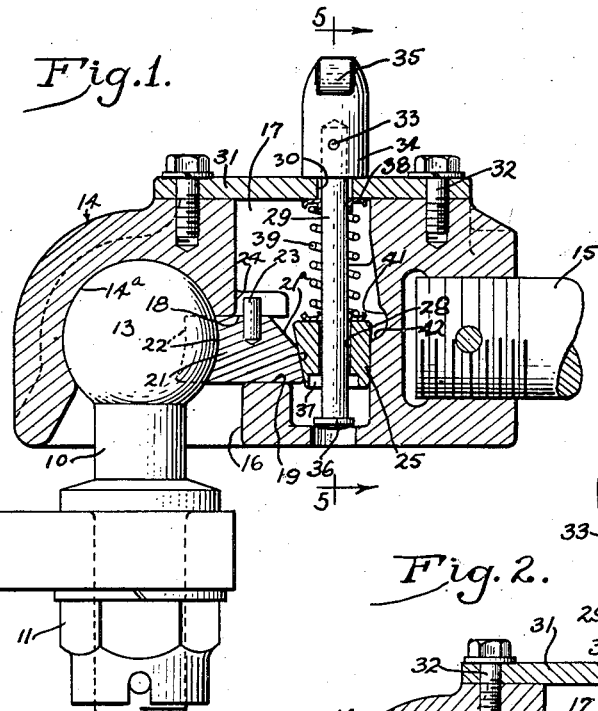
Figure 1 is a longitudinal sectional view of the improved coupling.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

Referring first to Figs. 1 to 5, the male coupling element comprises an upstanding king pin 10 usually clamped by a nut 11 to a part 12 preferably rigid with one of the vehicles to be connected so as to define a vertical axis of swiveling perpendicular to the line of the tractive force. The head 13 of the king pin is spherical to permit a substantial degree of universal swiveling between the ball and the socket element 14 which detachably receives the ball 13 and is fastened to a draw bar 15 or other part on the other vehicle. Herein, this element is an elongated casting into the rear end of which the bar 15 is threaded.

At its forward end, the casing 14 has a downwardly opening socket recess defined by a wall 14$^a$ complementing the contour of the ball 13. The rear side of the recess is enlarged as indicated at 16 to provide an opening larger than the ball diameter whereby to permit of entry and withdrawal of the ball during coupling and uncoupling of the two vehicles.

Figure 2:
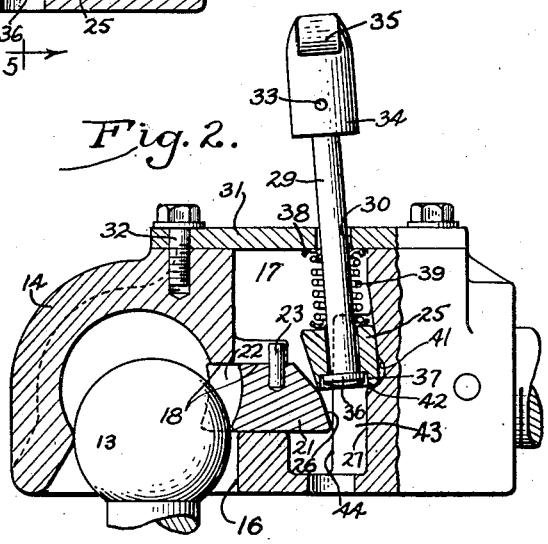
Fig. 2 is a similar view showing the coupling parts in released positions.

Between the socket recess and the draw bar 15 the casting 14 is formed with an upwardly opening cavity 17 whose walls are shaped to perform numerous functions. This cavity communicates with the socket recess through a passage defined by upper and lower horizontal walls 18 and 19, and side walls 20 all of which cooperate to form horizontal guideways in which a jaw 21 slides. The latter projects forwardly into the socket recess and has a concave front face 22 adapted to fit around the ball and underlie the latter sufficiently to hold it in the socket when the jaw is projected forwardly as shown in Fig. 1. When the jaw is released and permitted to slide rearwardly, the ball may be withdrawn from the socket as shown in Fig. 2, the jaw being cammed rearwardly out of the way in the withdrawal of the ball. A pin 23 upstanding from the jaw 21 and disposed in a slot 23$^a$ is adapted to engage an abutment 24 and limit the forward movement of the jaw into the socket recess so as to avoid any possibility of the jaw blocking the re-entry of the ball into the socket.

The jaw is projected forwardly and locked around the ball in the downward movement of a locking member 25 which comprises a block somewhat narrower than the jaw 21 and disposed within the cavity 17 between opposed guide surfaces 43 on the side walls thereof. The block is wedge shaped having front and rear downwardly converging surfaces which is the locked position shown in Fig. 1 are in full contact with similarly converging surfaces 26 and 27 on the rear end of the jaw 21 and at the back of the cavity 17. Thus, the wedge member 25 is backed rigidly by the casting and is adapted to sustain any force which the ball applies to the jaw tending to slide the latter rearwardly. The surfaces 26 and 27 are inclined relative to each other approximately ten degrees so that there is no tendency for the member to rise under a rearwardly directed force exerted by the jaw. Both of the surfaces may be inclined relative to the vertical to provide the ten degree taper, or the surface 27 may be disposed vertically as shown and the surface 26 inclined the full ten degrees.

To permit the member 25 to be raised out of locking position and latched in this position, it is formed with a vertical bore 28 through which loosely extends a rod 29 projecting upwardly through a hole 30 in a plate 31 detachably secured to the top of the casting 14 by cap screws 32 and covering the cavity 17. The upper end of the rod projects into and is secured by a pin 33 to the hub 34 of a handle 35. A head 36 on the lower end of the rod 29 is adapted to seat in a counterbore 37 so that the wedge member 25 may be raised by the handle after taking up the slack in the lost motion connection. The handle is thus guided vertically and held by the cover plate 31 against lateral banding but at the same time is free to slide vertically and to tilt forwardly and rearwardly as permitted by the enlarged hole 30. A spring 39 coiled around the rod 29 within the cavity 17 acts in compression between a washer on the locking member 25 and a washer 38 bearing against the underside of the plate 30. The locking member is thus urged downwardly into jaw locking position and, acting on an inclined upper surface 21ª at the rear of the jaw 21, cams the latter forwardly into the socket 14ª and enters between the jaw surface 26 and the surface 27. In this position (Fig. 1) the rod 29 is disposed vertically, and the jaw 21 is wedged forwardly against the ball 13. Thus the wedge is urged by its own weight into locked position in the event of breakage of the spring. As a result, there is practically no danger of the member 25 being dislodged accidentally from locked position.

Figure 3:
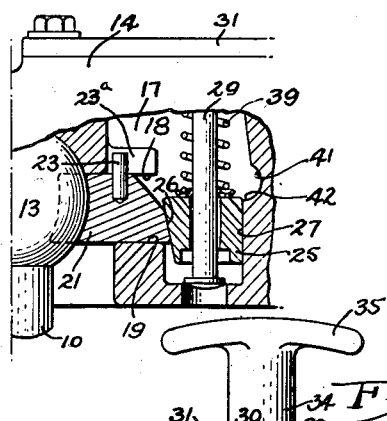
Fig. 3 is a fragmentary view similar to Fig. 1 illustrating the manner of taking up looseness of the parts.
Figure 4:
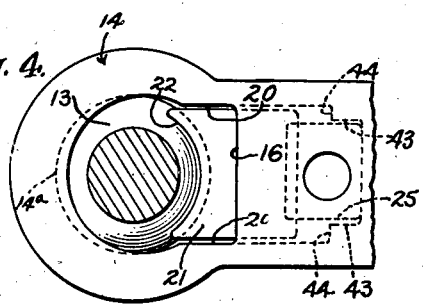
Fig. 4 is a fragmentary under side view.
Figure 5:
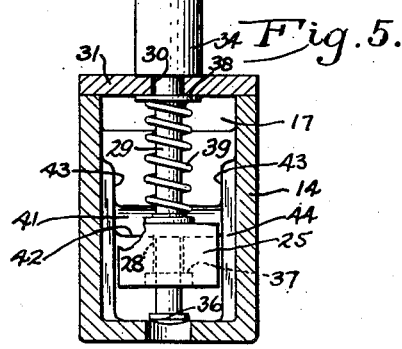
Fig. 5 is a section taken along the line 5—5 of Fig. 1.

It will be observed that the member 25 automatically takes up any wear or looseness between the ball and the jaw by moving downwardly until the jaw comes firmly against the ball. Thus, locking of the jaw may be effected by a partial entry of the member between the surfaces 26 and 27 (Fig. 1) or a further movement of the member may take place as shown in Fig. 3 depending on the size of the ball and jaw. It will be observed that movement of the member to lock the jaw is controlled by the spring 39 because of the lost motion connection between the rod 29 and the member. As a result, there is no danger of the member being forced into locking position so firmly by normal pressure as to make its release difficult when it is desired to uncouple the connected vehicle. Another advantage of this arrangement is that the handle hub 34 always rests, when the coupling is locked, on the plate 31 and covers the hole 30 so as to exclude water and foreign matter.

To release the jaw and permit withdrawal of the ball 13 from the socket, the handle 35 is raised and, after the member 25 has been withdrawn sufficiently to permit release of the ball, the handle and the rod are tipped forwardly as shown in Fig. 2 to move the lower end of the block into a notch 41 cast in the rear wall of the cavity 17. Then, as the handle is allowed to lower under the action of the spring 39, the member 25 engages on a ledge 42 and becomes latched. Now, the jaw 21 may move rearwardly permitting withdrawal of the ball from the socket. By thus forming the latch 42 on the socket member 14 and within the casting so as to act directly on the member, the construction of the coupling as a whole is greatly simplified and all of the socket parts are well protected by the casting structure. Rearward movement of the jaw 21 is limited by surfaces 44 cast within the cavity 17 behind the jaw so that there is no danger of the jaw moving so far rearwardly as to block downward movement of the member 25 in the intended manner.

After the ball has been reentered in the socket 15 preparatory to recoupling of the two vehicles, locking of the coupling is effected simply by pushing the handle 35 rearwardly to carry the member 25 off from the latch surface 42. Thereupon, the spring 39 urges the handle and the member downwardly, the member first acting on the surface 21ª to cam the jaw against the ball and then entering between the surfaces 26 and 27 to block the jaw against retraction.

It will be observed that the main operating parts are of simple and inexpensive construction and that the main casting surfaces which coact with the jaw may be formed by casting. The jaw actuating mechanism including the handle and the latch is rugged in construction and yet is operated conveniently and without the necessity of tools either in coupling or uncoupling of the two vehicles. Since the locking member 25 moves downwardly instead of upwardly to effect locking of the coupling, the possibility of the vehicles becoming disconnected is virtually eliminated.

I claim as my invention:

1. A vehicle coupling having, in combination, a king pin adapted to be mounted on one vehicle in vertical position, a hollow member mountable on a second vehicle and having a downwardly opening socket for receiving said king pin, a jaw mounted within said member to slide horizontally into and out of said socket to lock and unlock said king pin, the rear end surface of said jaw and the opposed surface of said member coacting to form a downwardly converging recess, a wedge complementing the contour of said recess and mounted on said member for movement into said recess to wedge said jaw against said king pin, spring means urging said wedge into said recess, and means rendered operative and inoperative selectively by movement of said wedge relative to said member to latch said wedge in raised position releasing said jaw.

2. A coupling having, in combination, a king pin having a ball shaped head and adapted to be mounted on one vehicle with its axis disposed vertically, a coacting coupling element having a socket for receiving said head, a jaw slidable horizontally on said element transversely of the axis of said king pin and engageable at one end with said head to hold the same in the socket, the other end of said jaw and said element forming a wedge shaped recess with walls diverging upwardly, a wedge mounted on said element for movement into and out of said recess to hold the jaw in locking position or to release the jaw, spring means acting on said wedge to urge the same downwardly into said recess, a rod projecting loosely through said wedge and having a handle by which said wedge may be raised against the action of said spring to release said jaw, and means for latching said wedge releasably in raised position releasing said jaw.

3. A coupling having, in combination, a king pin having a ball shaped head and adapted to be mounted on one vehicle with its axis disposed vertically, a coacting coupling element having a socket for receiving said head, a jaw slidable horizontally on said element transversely of the axis of said king pin and engageable at one end with said head to hold the same in the socket, the other end of said jaw and said element forming a wedge shaped recess with walls diverging upwardly, a wedge mounted on said element for movement into and out of said recess to hold the jaw in locking position or to release the jaw, a rod connected to said wedge and mounted on said element for vertical endwise movement and also for tilting movement, and latch means rendered active by tilting of said rod after raising of the wedge out of said recess, said latch means when active serving to hold the wedge in jaw-releasing position.

4. A coupling having, in combination, an element having a socket recess, a jaw projecting into said recess, a wedge mounted on said element for bodily movement to actuate said jaw and also for tilting movement, a handle having a lost motion connection with said wedge, and latch means rigid with said element interiorly thereof and engageable with said wedge during pivoting of the wedge to hold the latter in jaw-releasing position.

5. A coupling having, in combination, a hollow member providing a socket recess, a handle mounted on said member for sliding and pivotal movement, a coupling locking element movably mounted within said member and operatively connected to said handle, and latch means formed on said member and engageable directly with said element during pivoting of the handle to hold the element and handle releasably in coupling locking position.

6. A coupling having, in combination, a hollow member providing a socket recess, a handle mounted on said member for sliding and pivotal movement and projecting externally of the member, a coupling locking element movably mounted within said member operatively connected to said handle, and latch means formed on an internal wall of said member and engageable with said element in the pivoting thereof to hold the handle releasably in coupling released position.

7. A coupling having, in combination, a member providing a socket recess, a jaw slidable on said member into and out of said recess, a wedge movable on said member in one direction to cam said jaw into said recess and in the opposite direction to release the jaw, said wedge also being tiltable relative to the member, a shoulder on said wedge extending transversely of the jaw-actuating motion of the wedge, and latch means rigid with said member and engageable directly with said wedge shoulder by tilting of the wedge in one direction after release of the jaw whereby to hold the wedge releasably in jaw-released position.

8. A coupling having, in combination, a member providing a socket recess, a jaw slidable on said member into and out of said recess, a wedge movable on said member in one direction to cam said jaw into said recess and in the opposite direction to release the jaw, said wedge also being tiltable relative to the member, latch means rigid with said member and engageable directly with said wedge to hold the latter releasably in jaw-released position, a handle having a loose connection with said wedge operable to move the wedge in said opposite direction, and spring means urging said wedge relative to said handle in a direction to lock said jaw.

CHARLES POLSTRA.